June 28, 1960 W. R. PRICE ET AL 2,942,301
METHOD OF MAKING A RECEPTACLE OF FOAMED POLYSTYRENE
Filed May 9, 1957

Inventors
WARREN R. PRICE
ALEXANDER STANLEY HOUSTON by [signature] Attys.

United States Patent Office 2,942,301
Patented June 28, 1960

2,942,301
METHOD OF MAKING A RECEPTACLE OF FOAMED POLYSTYRENE

Warren R. Price, Skokie, and Alexander S. Houston, Chicago, Ill., assignors to Central Waxed Paper Company, Chicago, Ill., a corporation of Illinois Filed May 9, 1957, Ser. No. 658,155

1 Claim. (Cl. 18—56)

The instant invention relates to a method of making receptacles, and more particularly, to a method of making a receptacle structure formed of foamed polystyrene.

The formation of foamed resins is known generally and, for example, as indicated in U.S. Patent No. 2,023,204, issued to Munters and Tandberg and U.S. Patent No. 2,450,436, issued to McIntire, the manufacture of foamed polystyrene is well known. The instant invention, however, resides in a method of making a particular structure formed of highly vesiculated lightweight polystyrene composed of closed cells, in which the structure is in the form of a receptacle, having been formed from a flat sheet by hot-drawing.

The resulting receptacle has unique properties and is economically manufactured so that it is competitive with paper cups or receptacles and has distinct advantages thereover in its physical properties. For example, the instant material is very lightweight and, although it is hot-drawn or formed from a flat sheet into the receptacle shape, the insulating properties thereof are not lost. Instead, the instant receptacle has such distinctly superior heat insulative properties that the cup may be retained in the hand, even though boiling water is poured into the cup. The instant material is, of course, moisture-proof. The cells therein are closed cells, so that moisture permeation is prevented and the advantages of insulation are retained. The instant material is also grease-resistant. The instant material is also distinctly superior to paper cups in that it does not impart a taste to beverages (particularly alcoholic beverages) retained therein. In contrast, the usual wax-coated paper cup is not sufficiently resistant to alcoholic beverages to prevent imparting taste thereto. Although the foamed polystyrene sheet material from which the instant receptacle is formed is very thin and lightweight, the instant cup is quite strong, easily as strong as paper cups, and is self-supporting under the weight of the liquid therein.

It is, therefore, an important object of the instant invention to produce an improved receptacle.

It is another object of the instant invention to produce a superior cup for retaining liquids, which is highly resistant to liquid permeation.

Still another object of the instant invention is to produce an improved cup formed of grease-proof, moisture-proof, lightweight, heat insulative foamed polystyrene.

Other and further objects, features and advantages of the present invention will become apparent to those skilled in the art from the following detailed disclosure thereof and the drawings attached hereto and made a part hereof.

Figure 1:
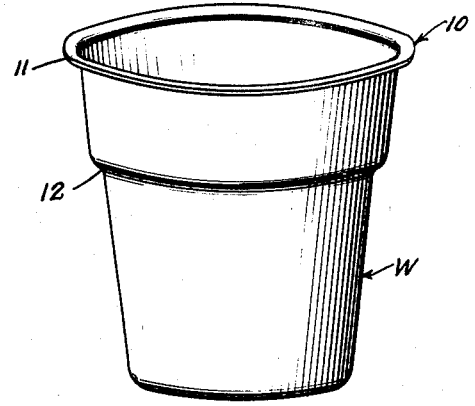
Figure 1 is a view in perspective of a receptacle made according to the instant invention.
Figure 2:
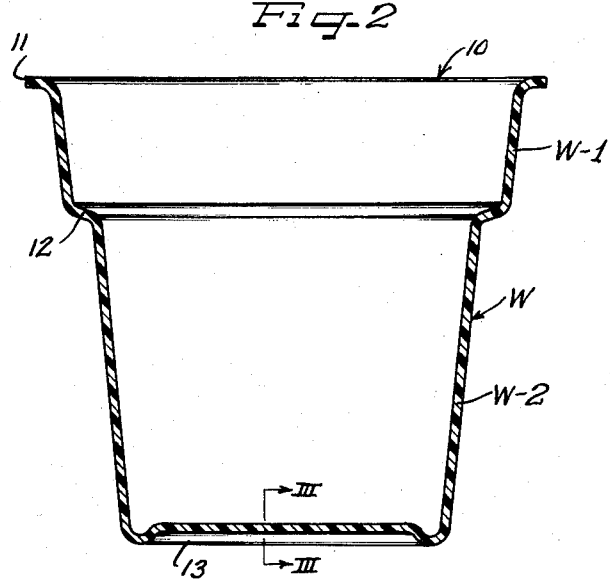
Figure 2 is an enlarged sectional elevational view of the receptacle of Figure 1.

In Figures 1 and 2, there is shown a receptacle or cup indicated generally by the reference numeral 10. Actually, the cup 10 has the general shape of a flower pot and, although it will be appreciated that a number of other receptacle shapes may be employed in the practice of the instant invention, it will be appreciated that the cup 10 has certain advantageous structural features. For example, an outwardly turned flange or lip 11 is formed along the top periphery of the cup 10 and an annular ridge 12 is formed in the upstanding cup walls W intermediate the bottom 13 and the top lip 11. The top lip 11 and the intermediate ridge 12 give added strength to the cup 10 and facilitate the manual handling thereof.

As will be seen from Figure 2, the walls W of the cup 10 are tapered generally from the top lip 11 to the reduced diameter of the bottom 13. Actually there is an upper wall portion W-1 which tapers inwardly from the top lip 11 to the ridge 12, whereat the diameter of the walls W is reduced; and the lower wall portion W-2 also tapers inwardly from the annular ridge 12 to the bottom 13.

Figure 3:
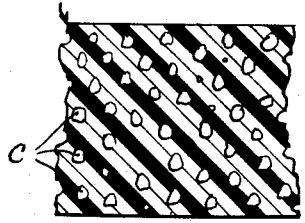
Figure 3 is a more greatly enlarged sectional elevational detail view taken substantially along the line III—III of Figure 2.

As indicated in Figure 3, the cup 10 is formed of a highly vesiculated lightweight mass of polystyrene (indicated in section) composed of numerous closed cells C (indicated as circles in Figure 3).

In general the cup 10 is formed by initially extruding foamed polystyrene into a flat sheet of substantially uniform thickness in the range of 0.020 to 0.070 inch, followed by hot-drawing this flat sheet into the instant cup between suitable dies which are heated at a temperature (of about 150° C.) sufficient to effect deformation of the flat sheet. The deformation effected is permanent, because the material is heated to its deformation temperature between the dies. This requires the application of pressure, of course, in order to effect such deformation, but the small cells C which may be crushed or eliminated during the hot pressing operation tend to appear substantially entirely as they were in the original flat sheet as soon as the pressure is removed. The pressure is removed while the material is still hot. In this way the cellular character of the material is not lost during this subsequent forming step. The advantages of lightweight and heat insulation are retained, while the additional advantages of strength in the receptacle-shaped device are gained. The inherent resilience in the material is retained to a desirable extent.

The resulting cup is unique in a number of respects. In appearance, it has a generally fibrous character, which is due to the extrusion forming operation of the initial flat sheet, but which is not lost by the subsequent hot-deformation. In effect, the hot-deformation subtracts nothing from the original advantageous features of the flat sheet, but adds the desired structure of the receptacle. The instant receptacle is unique in that it can be held in the hand while very hot water is poured into the recaptacle, and the insulating effect is so good that one is barely able to feel a slight warming of the outside walls of the cup when hot water is poured into the cup.

In the practice of the instant invention the initially formed flat sheet is preferably formed by extrusion through a circular orifice followed by slitting of the resulting tubular material so as to form the flat sheet. The extrusion is preferably carried out by a so-called "blow" extrusion process. The general features of this type of procedure are shown in the aforementioned McIntire U.S. Patent No. 2,450,436. In a continuous operation, of course, the materials are fed into one end of the extruder with a suitable gas generating material, which may be in the form of a material which is normally a gas or it may be in the form of a material which decomposes at the temperature which the material reaches just before departing from the extruder. If the material is normally a gas such as methyl chloride, it may be fed into the extruder under the necessary pressure, as in the case of any volatile gas; and such gas thus fed into the material functions as a propellant for the extruder as well as the cell-forming material within the mass. Methyl chloride is superior because it is soluble in the polystyrene.

Polystyrene is inherently a poor conductor of heat, so the material is heated in the extruder to effect a sufficient softening thereof and the dissolving of the methyl chloride therein effects the formation of a gel, which is extruded from the machine. The extrusion thereof releases the pressure on the polystyrene mass thus permitting the methyl chloride (or other gas-forming material) retained or dissolved therein to separate from the viscous solid mass and form numerous small gas cells. The formation of the gas requires heat of vaporization which effects cooling of the polystyrene (which could not be cooled easily in other ways because of the poor heat conductivity).

For example, the polystyrene material which may be formed by carrying out the instant process may have a specific gravity as low as 0.04. Sheets of such material are available commercially in thicknesses ranging from 0.020 inch to 0.070 inch (and specific gravity of 0.04), and such sheets may be hot-formed into a receptacle such as the cup 10.

As a specific example, a sheet of foamed polystyrene having a thickness of 0.030 inch and a specific gravity of 0.04 is laid over a positive mold member having the general shape of the interior of the cup 10, and a negative mold member is pressed down over the sheet at 15 p.s.i. gauge pressure, while the sheet is heated to 150° C. The mold is opened while the sheet is still hot. The resulting cup 10 is found to have excellent strength and resilience. It has retained its original specific gravity of 0.04 and its grease-proof and water-proof properties. It is also a heat insulator whose thermal conductivity $k$ (in B.t.u./square foot/hour/° F. per foot) is found to be in the order of 0.25.

Comparable results are obtained using the same operating conditions on a sheet of extruded polystyrene having a thickness of 0.05 inch.

It will be understood that modifications and variations may be effected without departing from the spirit and scope of the novel concepts of the present invention.

We claim as our invention:

A method of forming a receptacle which comprises providing an extruded, highly vesiculated sheet of polystyrene having closed cells therein, heating said sheet to its deformation temperature while applying a forming pressure on said sheet to form the same into an open-ended receptacle of substantially uniform wall thickness, said forming pressure tending to distort the cellular form of said sheet, and removing said forming pressure while said sheet is still hot to thereby permit said sheet to recover its cellular character.

References Cited in the file of this patent

UNITED STATES PATENTS

| | | |
|---|---|---|
| 1,852,830 | Whitcomb | Apr. 5, 1932 |
| 2,167,999 | Riley | Aug. 1, 1939 |
| 2,255,116 | Helmstaedter | Sept. 9, 1941 |
| 2,316,150 | Amberg | Apr. 13, 1943 |
| 2,452,999 | Daly et al. | Nov. 2, 1948 |
| 2,472,060 | Beylerian | June 7, 1949 |
| 2,521,388 | Maynard et al. | Sept. 5, 1950 |
| 2,722,719 | Altstadter | Nov. 8, 1955 |

OTHER REFERENCES

Plastic Engineering Handbook (The Soc. of the Plastics Ind.), published by Reinhold Publishing Corp., 1954, New York (pages 154–160 relied on). Copy in Scientific Library and Div. 15.